United States Patent [19]

Wiese

[11] Patent Number: 5,083,651

[45] Date of Patent: Jan. 28, 1992

[54] TABLET FEED ASSEMBLY

[75] Inventor: Delmar R. Wiese, Springfield, Mo.

[73] Assignee: Custom Metalcraft Inc., Springfield, Mo.

[21] Appl. No.: 517,770

[22] Filed: May 2, 1990

[51] Int. Cl.⁵ .............................................. B65G 11/06
[52] U.S. Cl. ...................................................... 193/12
[58] Field of Search .......................... 193/12; 414/299; 53/245, 248, 255

[56] References Cited

U.S. PATENT DOCUMENTS

| | | | |
|---|---|---|---|
| 826,729 | 7/1906 | Marsh | 193/12 |
| 1,750,081 | 3/1930 | Wood et al. | 193/12 |
| 1,802,089 | 4/1931 | Pfeiffer | 193/12 |
| 1,928,459 | 9/1933 | Pardee | 193/12 |
| 1,993,945 | 3/1935 | Peterson | 193/12 |

Primary Examiner—Joseph E. Valenza
Attorney, Agent, or Firm—Nies, Kurz, Bergert & Tamburro

[57] ABSTRACT

A feed assembly for use in filling a container with tablets or other materials is disclosed. The assembly includes a spiral chute which is constructed of a series of interconnected chute segments having a stepped configuration between adjacent segments. A segment support is located in the vertical wall at each junction of chute segments. The action resulting from the protrusions provided by the segment supports, together with the drop caused by the stepped configuration between chute segments, assists in allowing the tablets to remain in motion as they travel along the chute rather than backing up or "freight-training" along the length of the chute.

3 Claims, 2 Drawing Sheets

TABLET FEED ASSEMBLY

BACKGROUND AND SUMMARY OF THE INVENTION

The present invention relates to a feed assembly for use in filling a container with tablets or other materials. More particularly, the present invention relates to a tablet feed assembly which employs a spiral chute having features which provide a maximum fill of tablets for a container while also providing a cushion to prevent tablets from being crushed or broken.

Previous spiral chute assemblies are described in the following patents U.S. Pat. No. 1,750,081 to Wood et al.; U.S. Pat. No. 3,565,226 to Winchester; British Patent No. 494,894; British Patent No. 769,312; and German Patent No. 725,309.

By the present invention, there is provided a feed assembly for tablets or other materials which employs a spiral chute having features which aid in the filling of a container with the tablets while also preventing damage to the tablets.

Accordingly, it is an object of the present invention to provide a feed assembly, particularly for tablets or other fragile materials requiring special handling, having features which maintain the tablets in motion and which provide for the tablets to be maintained in a compact grouping to allow a maximum fill of the container.

It is another object of the invention to provide a tablet feed assembly which prevents the tablets from "freighttraining" wherein one tablet follows right after another, but in a formation which is only one tablet deep.

It is a further object of the invention to provide a feed assembly having a spiral chute which prevents the tablets from crashing into one another and thus preventing damage. The present construction also helps to support the weight of the tablets and thus reduces tablet crushing.

It is another object of the present invention to provide a spiral chute assembly in which the combination of diameter and slope of the slide allows the tablets to flow at a controlled rate.

DESCRIPTION OF THE PREFERRED EMBODIMENTS

In the embodiment of the invention as shown in FIGS. 1 through 5, there is provided a tablet feed assembly 10 which may be employed in a container or bin. A cover assembly 12 may be provided for enclosing the upper end of the bin.

In the upper portion of the bin, a product inlet 24 and an opening 26 for a cleaning nozzle are provided. The bin may be rectangular or round in cross-section, as the shape of the container does not affect the operation.

Figure 4:
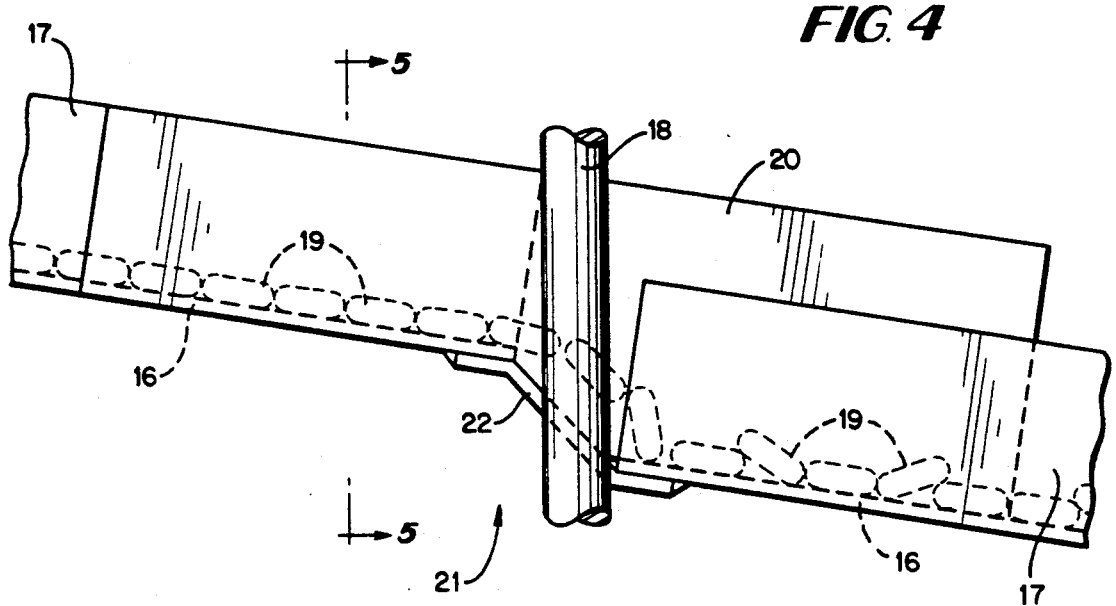
FIG. 4 is a side elevation of the feed assembly as shown in FIG. 3.

A product feed chute 14 passes product from the opening 24 to a series of chute segments 16 which extend in helical arrangement throughout the length of the assembly 10, with the spiral segments 16 being interconnected in a stepped relationship. A series of offset segment supports 20 are provided to tie the adjacent chute segments 16 together and also to interconnect the segments 16 with support rods 18. Each segment support 20 is of narrow shape on the upstream end and of wider shape on the downstream end as shown in FIG. 4. This shape allows each support 20 to follow the step-down configuration of successive chute segments 16. The chute segments 16 have a vertical side wall portion 17 which extends along the outer periphery of the helical configuration.

Figure 5:
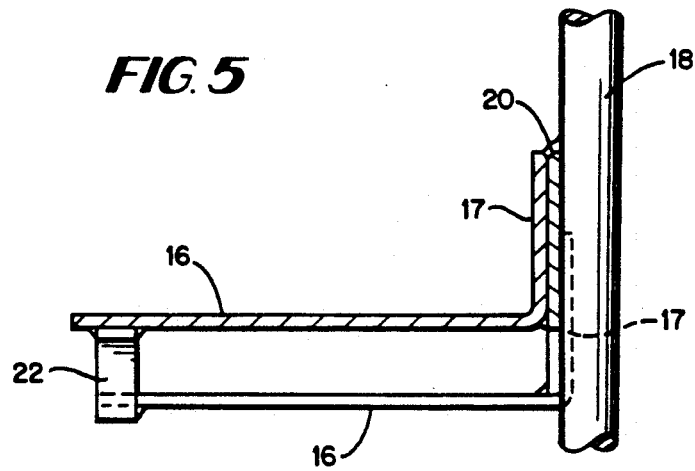
FIG. 5 is a cross sectional view taken along line 5—5 of FIG. 4.

As shown in detail in FIGS. 4 and 5, a series of segment supports in the form of straps 22 are located inwardly of the support rods 18 and function to tie the chute segments 16 together. Thus the ends of the chute segments 16 combine with the adjacent supports 20 and straps 22 to provide a series of steps 21 along the length of the helical chute arrangement. An open space remains between the segment support 20 and the strap 22 for each step 21.

The length of the support rods 18 and the number of segments 16 can be varied depending on the height of the container. Also, the angle of the chute segments 16 can be varied, depending upon the product which is being processed. The combination of the pitch and diameter of the spiral chute will determine the speed at which the product travels down the chute and the pitch or degree of slope may be varied to suit individual products. In addition, a constant angle of pitch may be provided from the top to the bottom of the container or the pitch may be varied along the length of the container.

The offset steps 21 provided by segments 20 and 22 are of assistance in breaking up the pattern of the product such as tablets 19 and in the prevention of "freighttraining" which would otherwise result in a single layer of tablets 19 extending upwardly throughout the length of the helical chute.

Figure 1:
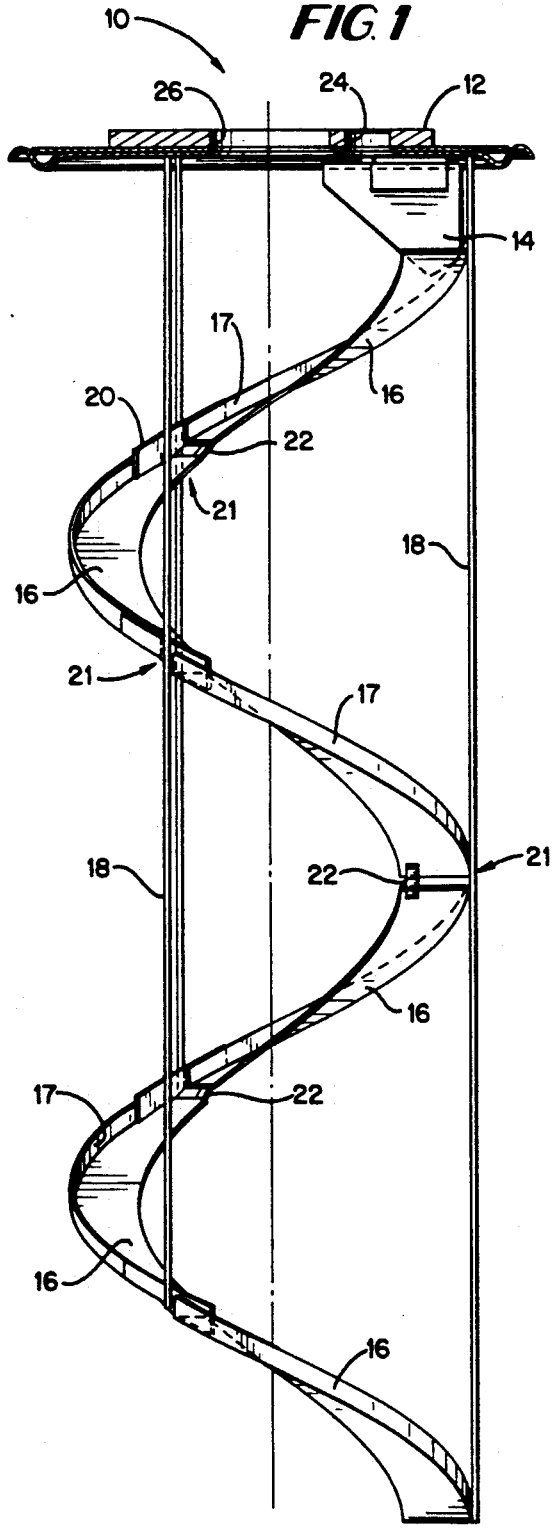
FIG. 1 is a side elevation of a feed assembly constructed in accordance with the present invention.
Figure 2:
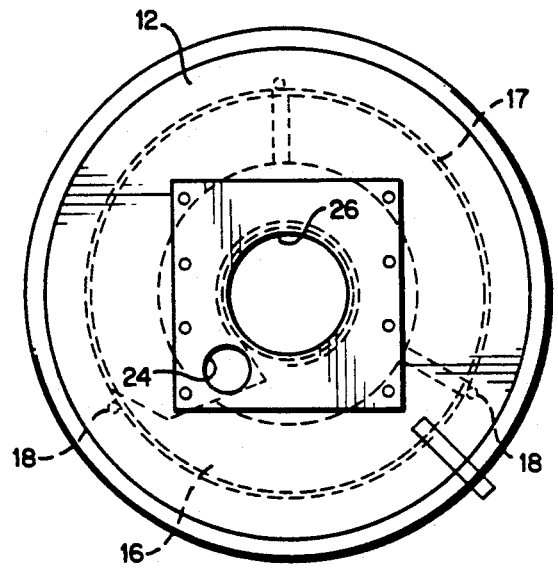
FIG. 2 is a top plan view of the feed assembly of FIG. 1.
Figure 3:
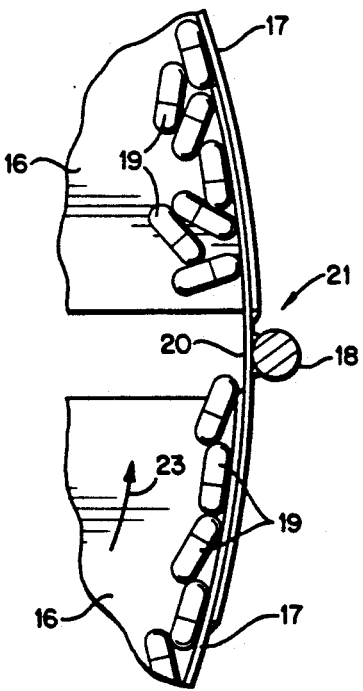
FIG. 3 is an enlarged plan view of a portion of the feed assembly of FIG. 1 showing the connection of the spiral segments of the chute with one of the support rods.

While a side wall 17 is provided on the outer perimeter of the chute, no side wall is necessary on the inner perimeter since the tablets 19 will remain toward the outside due to centrifugal force as they move downwardly in the direction of product flow as shown by the arrow 23 in FIG. 3. Also, in the bottom portion of the container, the product will spill over on the inside as the container fills.

As shown in FIGS. 3 and 5, at each junction of the chute segments 16, the wall 17 of the upper segment 16 is secured on the interior side, with the segment support 20 located adjacent upper segment 16 and with the wall 17 of the lower segment 16 positioned on the exterior of the chute assembly. The combination of the protrusions provided by the segments 20, plus the drop along the length of the chute at each junction of the chute segments 16, results in the product 19 remaining in motion rather than traveling and backing up in a straight line. Thus the features of the invention function to break up the straight line pattern which would otherwise result.

The tablet feed assembly of the present invention will accept materials of a fragile nature and allow them to pass gently from the top to the bottom of the container with minimal damage. Additional features of the invention result in the promotion of optimum filling of the container with the tablets and ease of cleaning of the entire assembly.

The entire tablet feed assembly may be lifted from one container and installed in a second container. Thus the assembly may be provided as a separate unit and adapted to any of various existing bins or containers. The present feed assembly may also be permanently installed if desired.

The tablet feed assembly of the present invention may be advantageously employed in various pharmaceutical and food grade units as well as in other non-food applications.

The tablet feed assembly of the present invention employs multiple features including an offset design and a construction which result in breaking up the product motion which is an important function of the multiple chute segments 6. Thus the drop between segments assists in keeping the material in motion as well as in the filling of a container with the material.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A feed assembly for use in filling a container with tablets or other materials, comprising:
   a helical chute including a plurality of interconnected chute thereof and with each successive chute segment being spaced from the previous chute segment to provide a gap therebetween; and
   a side wall support member interconnected only between the side walls of at least two of the adjacent chute segments such that a continuous barrier is formed by said side wall support member and the adjacent chute segment side walls, said side wall support member overlapping the side walls of the adjacent chute segments such that a protrusion is formed by each overlap of said side wall support member and one of the adjacent chute segment side walls, said protrusions being contacted by at least some of the tablets or other materials such that the flow of tablets or other materials is disturbed, thus preventing freight training or backing up of tablets or other materials to allow even flow thereof along the length of the chute.

2. The feed assembly of claim 1 further including at least one longitudinal support member secured to said helical chute.

3. The feed assembly of claim 1 wherein at least two of the adjacent chute segments are spaced in a step-down relation so as to provide a drop along the length of the chute.

* * * * *

UNITED STATES PATENT AND TRADEMARK OFFICE
CERTIFICATE OF CORRECTION

PATENT NO. : 5,083,651
DATED : January 28, 1992
INVENTOR(S) : Delmar R. Wiese

It is certified that error appears in the above-identified patent and that said Letters Patent is hereby corrected as shown below:

Column 3, line 18, that portion reading "chute segments 6" should read --chute segments 16--.

Column 4, line 6, after "chute" (first occurrence), insert --segments each having a side wall along the outer perimeter--.

Signed and Sealed this

Thirteenth Day of April, 1993

Attest:

STEPHEN G. KUNIN

*Attesting Officer*   *Acting Commissioner of Patents and Trademarks*